United States Patent [19]

Gunderson

[11] 4,315,680
[45] Feb. 16, 1982

[54] AUTOMATIC CAMERA

[75] Inventor: Norman R. Gunderson, Pasadena, Calif.

[73] Assignee: American Electronics, Inc., Fullerton, Calif.

[21] Appl. No.: 142,391

[22] Filed: Apr. 21, 1980

Related U.S. Application Data

[62] Division of Ser. No. 884,160, Mar. 7, 1978, Pat. No. 4,222,650.

[51] Int. Cl.³ ............................................. G03B 17/04
[52] U.S. Cl. ..................................... 354/195; 354/288
[58] Field of Search ............... 354/187, 190, 158, 195, 354/288; 352/242; 312/20

[56] References Cited

U.S. PATENT DOCUMENTS

| | | | |
|---|---|---|---|
| 2,495,223 | 1/1950 | Bodlander | 354/288 |
| 3,481,261 | 12/1969 | Fischer | 354/204 X |
| 3,486,431 | 12/1969 | Ettischer | 354/213 |
| 3,693,523 | 9/1972 | Tenkumo et al. | 354/250 X |
| 3,719,130 | 3/1973 | Scott, Jr. | 354/275 X |
| 3,878,546 | 4/1975 | Adamski | 354/173 |
| 3,898,679 | 8/1975 | Ogiso et al. | 354/173 |
| 3,918,075 | 11/1975 | Horn et al. | 354/213 |

FOREIGN PATENT DOCUMENTS

890949 10/1943 France .................................. 354/213

Primary Examiner—L. T. Hix
Assistant Examiner—William B. Perkey
Attorney, Agent, or Firm—Charles E. Wills

[57] ABSTRACT

A camera having powered mechanism for advancing a strip of film past a location at which the film is exposed to take a series of successive pictures on the film, with sensing means being provided adjacent the film and acting to respond to its longitudinal movement, and with automatic control means being provided for actuation by the sensing means in a relation halting operation of the film advancing mechanism when the sensing means determine that the film has been advanced through a predetermined distance.

6 Claims, 18 Drawing Figures

AUTOMATIC CAMERA

This is a division of application Ser. No. 884,160, filed Mar. 7, 1978, now U.S. Pat. No. 4,222,650.

BACKGROUND OF THE INVENTION

This invention relates to improved cameras of the type operable to take a series of pictures successively on an elongated strip of film. The camera is in some respects especially useful as a remotely controllable surveillance camera for taking pictures from a predetermined location in a bank or other establishment for evidence purposes.

Conventional cameras for taking pictures on strip film, such as, for example, standard 35 mm film, utilize a very substantial part of the width of the film for engaging the film advancing mechanism. More specifically, standard films contain sprocket openings extending along one or both sides of the film, for coacting with one or more driving sprocket wheels to move the film between successive positions in which different pictures are taken. A substantial part of the width of the film is thus wasted insofar as the ultimate size of the produced pictures is concerned, since the pictures can occupy only that portion of the film between the sprocket holes.

Other problems which can occur with conventional sprocket driven film involve the possibility of tearing of the film at the sprocket hole locations, and the necessity for carefully positioning the film and sprocket wheels relative to one another to attain a proper meshing relationship.

SUMMARY OF THE INVENTION

A major purpose of the present invention is to provide an improved, very simple and straightforward type of powered remotely controllable drive mechanism for a strip film camera. Particularly contemplated is an arrangement in which the film is driven in a manner avoiding the necessity for provision of sprocket openings in the film, and thus allowing use of the film as a photographic media across its entire width, rather than just at a central area between two series of sprocket openings.

To achieve these results, the camera includes powered film advancing means, preferably acting against an end of the film and acting to pull the film longitudinally past an exposure location, with the amount of advancement between each pair of successive frames being determined by sensing means positioned for actuation by the film itself and controlling operation of the film advancing apparatus. These sensing means function to automatically halt operation of the film advancing means when the film has advanced through a predetermined distance. To thus sense advancement of the film, the sensing means desirably include an element contacting and movable by the film, and preferably taking the form of a wheel which engages an edge portion of the film and is turned by the film as it advances. The wheel may have a series of fine teeth formed on its periphery, for engagement with a similar series of teeth formed along the edge of the film. Because the rotary element is only a motion sensing part, and is not required to drive the film itself, the toothed interengagement between the wheel and film need not be of a heavy type capable of transmitting film advancing forces.

The sensing wheel, in addition to its rotary movement, may also be mounted for bodily shifting movement, in a relation enabling it to be deflectable by a film when the latter is in position in the camera, and thus sense presence of the film. A switch actuated by this deflection of the sensing element may be utilized as a control for any convenient purpose in the camera, preferably for automatically de-energizing the main power circuit of the camera when no film is present.

On each cycle of operation of the camera, a portion of the film is exposed by a shutter structure, which may take the form of a rotary shutter disc. Actuation of a main control switch may commence operation of the shutter to take a picture, following which the film advancing mechanism is energized to advance the film under the ultimate control of the sensing means as discussed.

BRIEF DESCRIPTION OF THE DRAWINGS

The above and other objects and features of the invention will be better understood from the following detailed description of the typical embodiment illustrated in the accompanying drawings, in which.

DESCRIPTION OF THE PREFERRED EMBODIMENT

Figure 1:
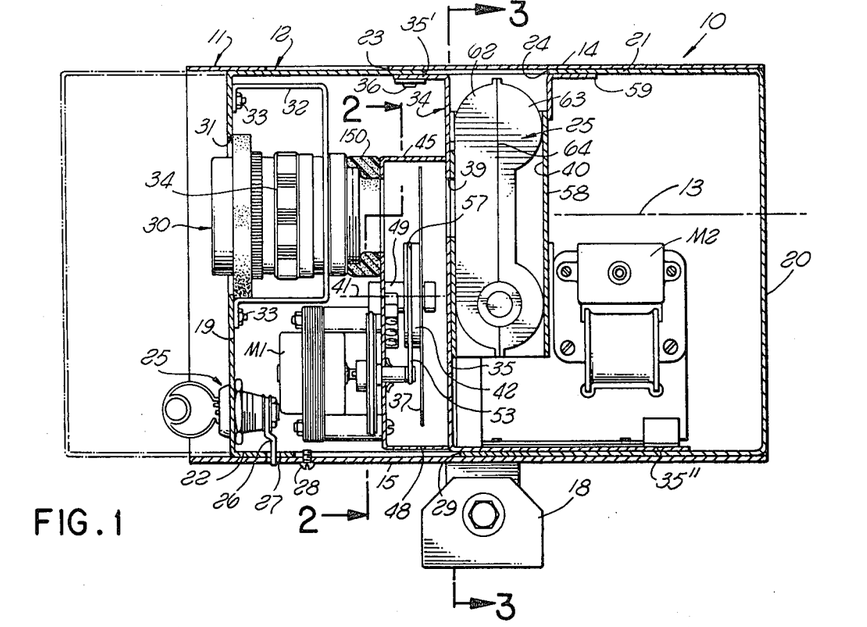
FIG. 1 is a central vertical front-to-rear section through a camera constructed in accordance with the invention.
Figure 2:
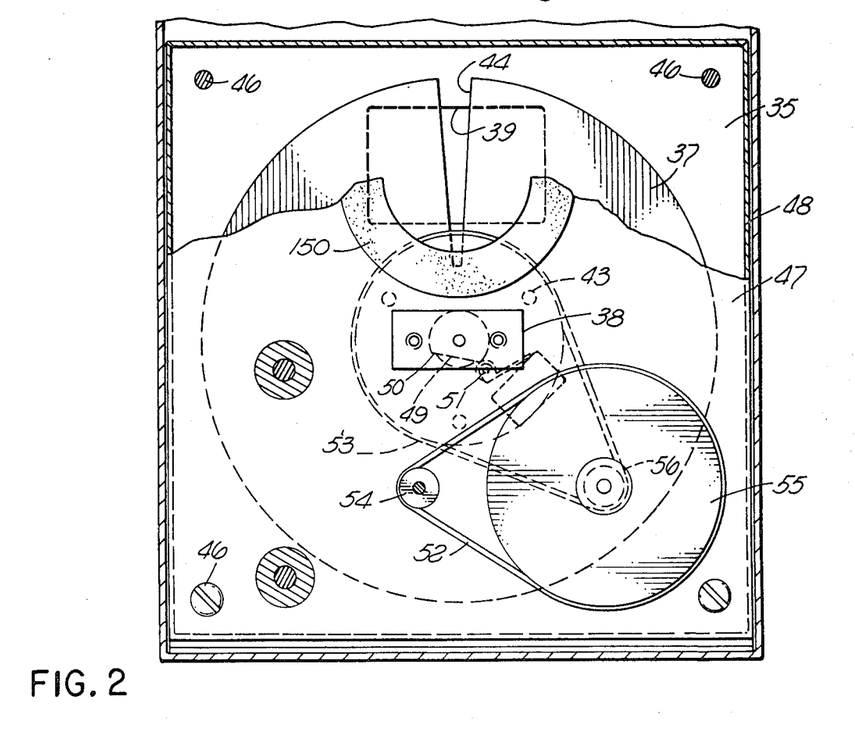
FIG. 2 is an enlarged fragmentary vertical transverse section taken on line 2—2 of FIG. 1.
Figures 3, 4, 5, 6, 7, 8, 9:
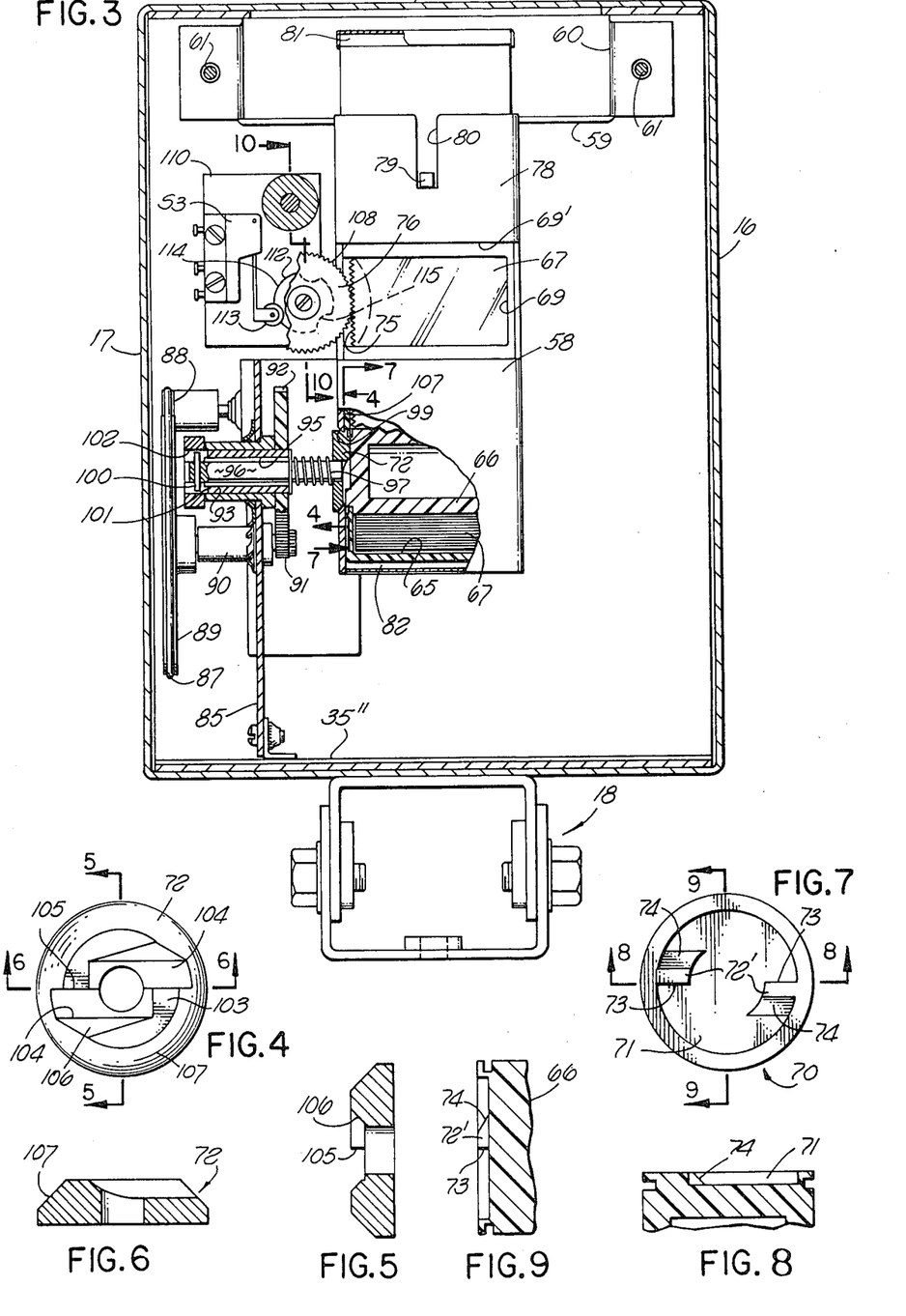
FIG. 3 is an enlarged vertical transverse section taken on line 3—3 of FIG. 1.
FIG. 4 is an enlarged end elevational view of the film drive element taken on line 4—4 of FIG. 3.
FIGS. 5 and 6 are mutually perpendicular sections taken on lines 5—5 and 6—6 respectively of FIG. 4.
FIG. 7 is an enlarged elevational view of the driven element of the film magazine, taken on line 7—7 of FIG. 3.
FIGS. 8 and 9 are fragmentary mutually perpendicular sections taken on lines 8—8 and 9—9 respectively of FIG. 7.

The camera 10 illustrated in the drawings includes an outer housing or case 11 within which an inner housing 12 carrying the working parts of the camera is slidably mounted for movement along a front-to-rear axis 13 of the device relative to the outer housing and between the full line active position of FIG. 1 and the forwardly projecting broken line reloading and lens setting position of that figure. The outer housing 11 is essentially tubular and of rectangular cross-section about axis 13, having horizontal top and bottom walls 14 and 15 and vertical opposite side walls 16 and 17 (FIGS. 1 and 3). A mounting bracket 18 may be connected to the bottom wall for securing the device to a support structure. The inner housing 12 has parallel vertical front and rear walls 19 and 20, and horizontal top and bottom walls 21 and 22, but has open sides providing access to the inner working parts of the camera when the inner housing 12 is removed from outer housing 11. In the FIG. 1 full line position of the inner housing, the front and rear walls 19 and 20 of the inner housing extend across and essentially close the front and rear ends of the outer housing 11, so that the two housings form together a closed box. In this position, the front wall 19 of housing 12 may be spaced slightly rearwardly of the front edge of outer housing 11, as seen in FIG. 1. When the inner housing 12 is moved forwardly to its broken line position of FIG. 1, this brings into registry two rectangular similarly dimensioned openings 23 and 24 in the top walls 14 and 21 of the two housing parts, so that a film magazine 25 may be inserted downwardly into the camera or removed upwardly from the camera through those openings. In the closed full line condition of the parts, the two openings 23 and 24 are completely out of registry to thus close the top of the camera. The inner housing may be locked in the full line closed position by a key operated lock mechanism 25 carried by the front wall of inner housing 12 and having a locking projection 26 which can be swung downwardly by the key actuated mechanism to project through registering apertures 27 formed in the bottom walls of the two housing parts to lock them against relative opening movement. The forward sliding movement of inner housing 12 relative to the outer housing can be limited in the broken line position of FIG. 1 by a screw or other fastener 28 carried by the bottom wall 15 of the outer housing and projecting upwardly into an elongated slot 29 formed in the bottom wall of the inner housing.

The various components of the camera which are carried by the inner housing 12 include a lens assembly 30 which extends through an opening 31 in the front wall of the inner housing part, and is mounted in any appropriate manner to that front wall, as by a bracket 32 secured thereto by screws or other fasteners 33. The lens assembly has adjusting rings 34 which are accessible to a user from the side of the camera when the inner housing is in the broken line forwardly displaced position of FIG. 1, to allow the user to set the aperture of the lens assembly and to focus the assembly for any desired subject to camera distance.

The rest of the parts of the camera are mounted to the inner housing by attachment to an inner bracket part 34 forming a main vertical wall 35 extending transversely of the front-to-rear axis 13 of the device and occupying substantially the entire cross-section of the rectangular housing. At the upper end of wall 35, bracket part 34 has a horizontally turned flange 35' which is secured by screws or fasteners 36 to top wall 21 of the inner housing part. At the lower end of wall 35, the part 34 has a rearwardly horizontally turned flange 35" secured by screws or other fasteners to the bottom wall of the inner housing. The main vertical wall 35 has a rectangular aperture 39 aligned with axis 13 of the lens assembly, to pass light from the lens assembly rearwardly through that aperture and into a compartment 40 within which the film magazine 25 is received.

A shutter disc 37 is mounted rotatably in front of transverse wall 35, to turn about an axis 41 parallel to but beneath the lens axis 13. The disc 37 may be secured to a central hub part 42 by a number of circularly spaced screws 43, and is opaque and externally circular and continuous about axis 41 except at the location of a radially extending slit 44 through which light can pass. The shutter may be contained within a typically square shutter housing part 45 secured rigidly to the front of wall 35 by screws 46. Part 45 has a front wall 47 parallel to and spaced forwardly of wall 35, and also has four rearwardly extending walls 48 extending about the periphery of front wall 47 and tightenable rearwardly against wall 35 by the screws 46. A tubular light shield element 150, typically formed of a resiliently deformable opaque plastic foam material, may be confined between lens assembly 30 and wall 47 as shown to prevent light leakage therebetween. Hub part 42 of the shutter is mounted by an appropriate bearing structure 38 to turn about axis 41, and carries a cam 49 which turns with the shutter parts 37 and 42 and actuates a microswitch S2 in accordance with rotation of the shutter. This microswitch is normally open and is closed momentarily for a short interval once during each revolution of the shutter disc, when a notch 50 on the cam reaches a position opposite the inwardly spring-pressed actuating arm 51 of switch S2.

The shutter is driven by an electric motor M1 mounted to the front of forward wall 47 of the shutter housing, and acting to drive the shutter through a speed reduction mechanism including two endless belts 52 and 53. Belt 52 is driven by a small pulley 54 of the motor, and drives a much larger second pulley 55 offset laterally from the motor and turning about an axis parallel thereto. This larger pulley 55 is mounted rotatably to front wall 47 of the shutter housing, and drives a smaller pulley 56 at the rear of that wall which is connected to belt 53. This belt 53 in turn is received within a peripheral groove 57 formed in the hub part 42 of the shutter structure, to drive the shutter rotatively at the desired reduced speed. As will be understood, the light passing slit 44 in the shutter is at a diameter to extend vertically across opening 39 in wall 35, and scans across that opening to expose the film to an image produced by the lens.

The film compartment 40 may be formed by a vertically extending tubular part 58 (FIGS. 1 and 3) secured to the back side of mounting wall 35 and having a rectangular horizontal section which is uniform along the vertical extent of part 58 and is dimensioned to exactly receive the film magazine 25 for upward and downward movement therein. A part 59 may be welded or otherwise secured to the upper end of part 58, and shaped to form at the upper end of film compartment 40 an enlarged compartment 60, having a greater length transversely of the camera than does compartment 40 to enable the user to easily grasp the upper end of the film magazine to remove it from the camera. This upper enlarged compartment 60 may have approximately the same rectangular horizontal section as the top rectangular film insertion openings 23 and 24 of the housing parts. The parts 58 and 59 forming the film receiving compartments may be secured to vertical wall 35 in any appropriate manner, as by a number of screws 61 extending through wall 35 and connecting threadedly into the parts 58 and 59.

The film magazine 25 may be formed of two molded parts 62 and 63 having edges at 64 meeting in light tight relation in a vertical plane continuously about the inner film space 65 in the magazine except at the location of opposite ends of a rotary spool 66 contained in the magazine. An elongated strip of film 67 is contained in the magazine, typically 35 mm in width, and is adapted to be wound on spool 66 by rotation of that spool, to pull the film longitudinally downwardly from an upper compartment 68 in the magazine and past an exposure opening 69 formed in the front wall of part 62. The ends of spool 66 engage the walls of the magazine in light tight relation, while at the same time permitting rotation of the spool, with one of those ends having a drive portion 70 by which the spool is to be turned. This drive portion 70 contains a recess 71 into which a rotary drive element 72 can project, with two generally diametrically opposite lugs 72' being formed in the recess. These lugs 72 have the cross-section illustrated in FIG. 9, with abrupt axially extending drive shoulders 73 at first sides thereof, and inclined cam surfaces 74 at their opposite sides, so that the art 72 can turn the spool in one direction but not the reverse thereof.

The film 67 within the magazine need not have the usual sprocket holes by which 35 mm film is ordinarily driven, and may be exposed to the image produced by lens assembly 30 across the entire width of the film. Along one of its edges, the film has a series of fine laterally projecting teeth 75, with laterally open notches formed between the teeth for engagement with a film movement following wheel 76 later to be discussed. For limiting the downward movement of the magazine 25 into film compartment 40, the vertical flat front wall 77 of the magazine which is received adjacent a forward vertical wall 78 of compartment forming part 58 may carry a forwardly projecting lug 79 which is movable downwardly into an upwardly opening notch 80 formed in the top edge of wall 78. In the position in which lug 79 contacts the lower end of notch 80 and is supported thereby against further downward movement (FIG. 3), the front opening 69 in the front wall of the magazine is exactly aligned with opening 39 in wall 35 and with a corresponding opening 69' in front wall 78 of part 58, for exposure of the film through these aligned openings during the next open period of the shutter. In that position, the upper end of the magazine projects upwardly into the enlarged upper compartment 60, to enable a user to grasp the upper end of the magazine as previously discussed.

At their upper and lower ends, the two parts 62 and 63 of the magazine have flanges 81 and 82, which meet one another in light sealing relation, and which are appropriately secured together. A metal clip 83 of U-shaped vertical cross-section may be received about one of these pairs of flanges, typically the upper pair as illustrated, and with the opposite ends 84 of the clip being turned downwardly adjacent the ends of the flanges as shown. The second pair of flanges at the other end of the magazine may be retained by a similar clip, but preferably are secured together by an adhesive material.

The rotary film advancing element 72 is driven by a second motor M2 (FIG. 1), which may be supported by a vertical plate 85 (FIG. 3) appropriately secured rigidly to walls 35 and 35" of bracket 34. Plate 85 desirably extends in a front-to-rear direction as shown, and drives the rotary part 72 through a speed reduction mechanism 86 (FIG. 3) typically including an endless belt 87 driven by a small pulley 88 on the motor shaft and driving a larger diameter pulley 89 whose shaft is journaled in a bearing structure 90 carried by plate 85 and drives a small pinion gear 91 meshing with a larger gear 92 on a rotary part 93 journaled in a bearing structure 94 also carried by plate 85. The part 93 which is rigidly secured to gear 92 contains a central axial recess 95 within which an externally cylindrical shank or shaft 96 attached rigidly to part 72 is slidably mounted by an appropriate sleeve bushing for relative axial movement. A spring 97 extending about this shank 96 and bearing against part 72 yieldingly urges that part axially through an opening 99 formed in a side of the film compartment forming element 58. A pin 100 is carried by shank 96 by extension through a transverse opening formed in an end of the shank, and has a splined relationship within diametrically opposite grooves 102 in part 93, to transmit rotary motion from gear 92 and part 93 to elements 96 and 72 while allowing axial movement of parts 96 and 72.

The part 72 has a face 103 which is shaped to mate with and drive in one rotary direction the portion 70 of the spool 66 of the film magazine. For this purpose, face 103 is adapted to project into recess 71 in the spool, and has two notches 104 shaped to receive and drive lugs 72' of the spool, with these notches having first axially extending shoulders 105 and opposite inclined cam surfaces 106 which will not drive the spool in the reverse direction. Part 72 projects into the film receiving compartment 40 just slightly beyond the inner surface 107 of the corresponding side wall of the compartment, and just far enough to allow driving engagement between part 73 and the spool. The extent to which part 72 thus projects into compartment 40, under the influence of spring 97, is limited by engagement of a beveled annular edge 107 of part 72 with the circular edge of opening 99. During insertion of a magazine into the film compartment, or withdrawal of a magazine from that compartment, the magazine surfaces contact a beveled edge 107 of part 72 to cam that part 72 slightly axially away from the film compartment and thereby enable the magazine to move past part 72 and then be returned axially inwardly into recess 71 by the spring 97.

Figure 10:
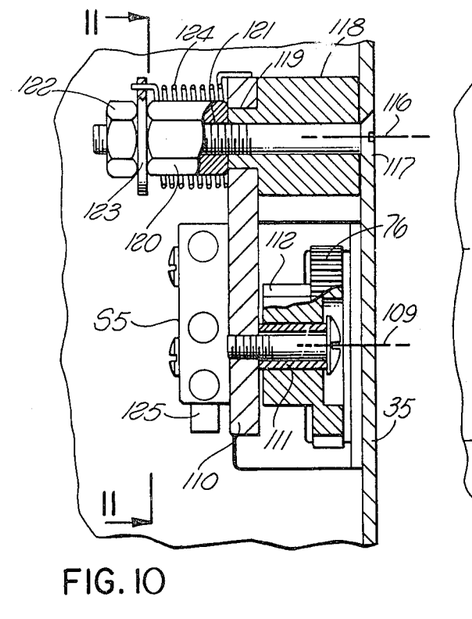
FIG. 10 is an enlarged fragmentary vertical section taken on line 10—10 of FIG. 3.

Energization of the film drive motor M2 is controlled in part by rotation of wheel 76 which meshes with and is driven by the teeth 75 formed along one edge of film 67 (FIG. 3). Wheel 76 has external gear teeth 108 about its periphery contacting teeth 75 of the film, in a relation turning wheel 76 about its axis 109 in response to and in correspondence with longitudinal movement of the film. Wheel 76 is carried by a mounting plate 110, which rigidly carries an axle part 111 about which wheel 76 is rotatably mounted (FIG. 10). The axis 109 of the wheel is parallel to main axis 13 of the camera, and the mounting plate 110 extends transversely of those axes. A cam 112 is connected to wheel 76 to turn with it (FIG. 3), and actuates a single pole double throw microswitch S3, with the body of the microswitch being carried by plate 110 and the actuating arm 113 movably engaging the cam. Desirably, arm 113 has a follower roller, as shown, which in most rotary positions of the wheel rides on a major diameter cylindrical surface 114 of the cam, but falls into notches 115 at three evenly circularly spaced locations to actuate the switch from a normal condition to an actuated condition at the locations of those notches. The double throw switch assembly S3 functions essentially as two switches designated as S3A and S3B in the circuit diagram of FIG. 18. The first of these switches S3A is normally open and is momentarily closed when follower 113 is in any of the notches 115, while the second switch S3B is normally closed and opens when the follower is in those notches. The longitudinal distance which the film travels between a first position when follower 113 is in one of the notches 15 and a next successive position in which the follower is in the next successive notch corresponds to the spacing between two successive frames on the film, or stated differently, is approximately equal to or just slightly greater than the vertical dimension of the picture framing aperture 69 in the front of the film magazine. As will appear at a later point, the circuitry which is controlled in part by wheel 76 acts when that wheel and its connnected cam reach a point at which the cam follower 113 falls into one of the notches 115 to halt advancement of the film until a picture has been taken at that particular location.

Figure 11:
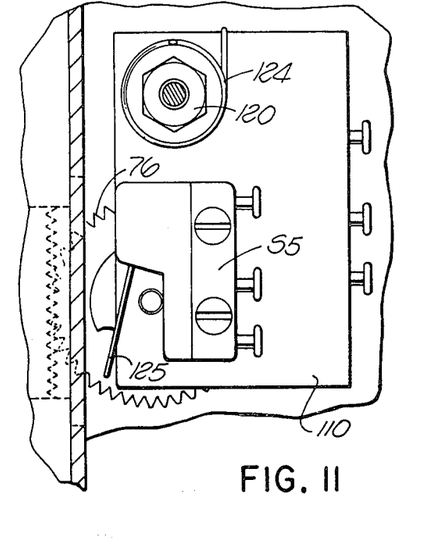
FIG. 11 is a fragmentary vertical section taken on line 11—11 of FIG. 10 showing the film motion sensing assembly in its operative position of engagement with the film.
Figure 12:
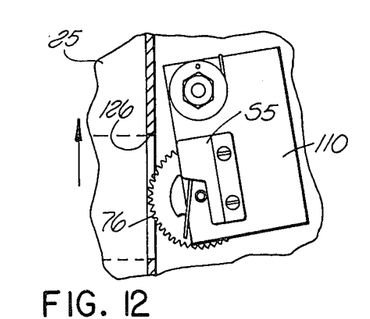
FIG. 12 is a reduced scale view similar to FIG. 11 but showing the film motion sensing assembly deflected to the position it assumes when engaged by the film magazine as the latter is inserted into or removed from the camera.

The wheel 76 and its associated mechanism also function to sense the presence or absence of film in the camera at the exposure location (at opening 69 in the magazine). For this purpose, the plate 110 and its carried parts are mounted for limited swinging movement about an axis 116 parallel to axis 109 (FIG. 10), to move wheel 76 toward and away from the film. This mounting is effected by providing a mounting screw 117 extending through an opening in stationary vertical wall 35 (FIG. 10), and extending through a spacer element 118 at the back of plate 35. The spacer 118 has a reduced diameter cylindrical portion 119 extending through an opening in plate 110 in a relation mounting that plate for its swinging movement about axis 116. A nut 120 is tightenable against the end of reduced portion 119 of part 118, and threadedly engages screw 117 at 121, to tightly clamp the part 118 and wall 35 between the head of screw 117 and nut 120. As will be understood, portion 119 of the spacer is just slightly longer than the thickness of plate 110 to allow pivotal movement of plate 110 while effectively confining it against substantial axial movement. A second nut 122 connected onto the screw tightens a washer 123 against nut 120, with the washer having an opening receiving a first end of a coil spring 124 whose opposite end engages plate 110 in a relation yieldingly urging the plate 110 about axis 116 in a clockwise direction as viewed in FIGS. 11 to 13. The spring thus yieldingly urges wheel 76 against the toothed edge of the film, with a force sufficient to assure rotation of the wheel in correspondence with longitudinal movement of the film, while at the same time avoiding exertion of sufficient force to damage or bend the film. When the end fo the film passes wheel 72, spring 124 urges wheel 76 farther inwardly (to the position of FIG. 13), and such inward movement automatically opens another microswitch S5, whose body is carried by and swings with plate 110 and whose relatively movable actuating arm 125 contacts a side of member 58 adjacent an opening 126 in that member through which wheel 76 projects inwardly into contact with the film.

Figure 18:
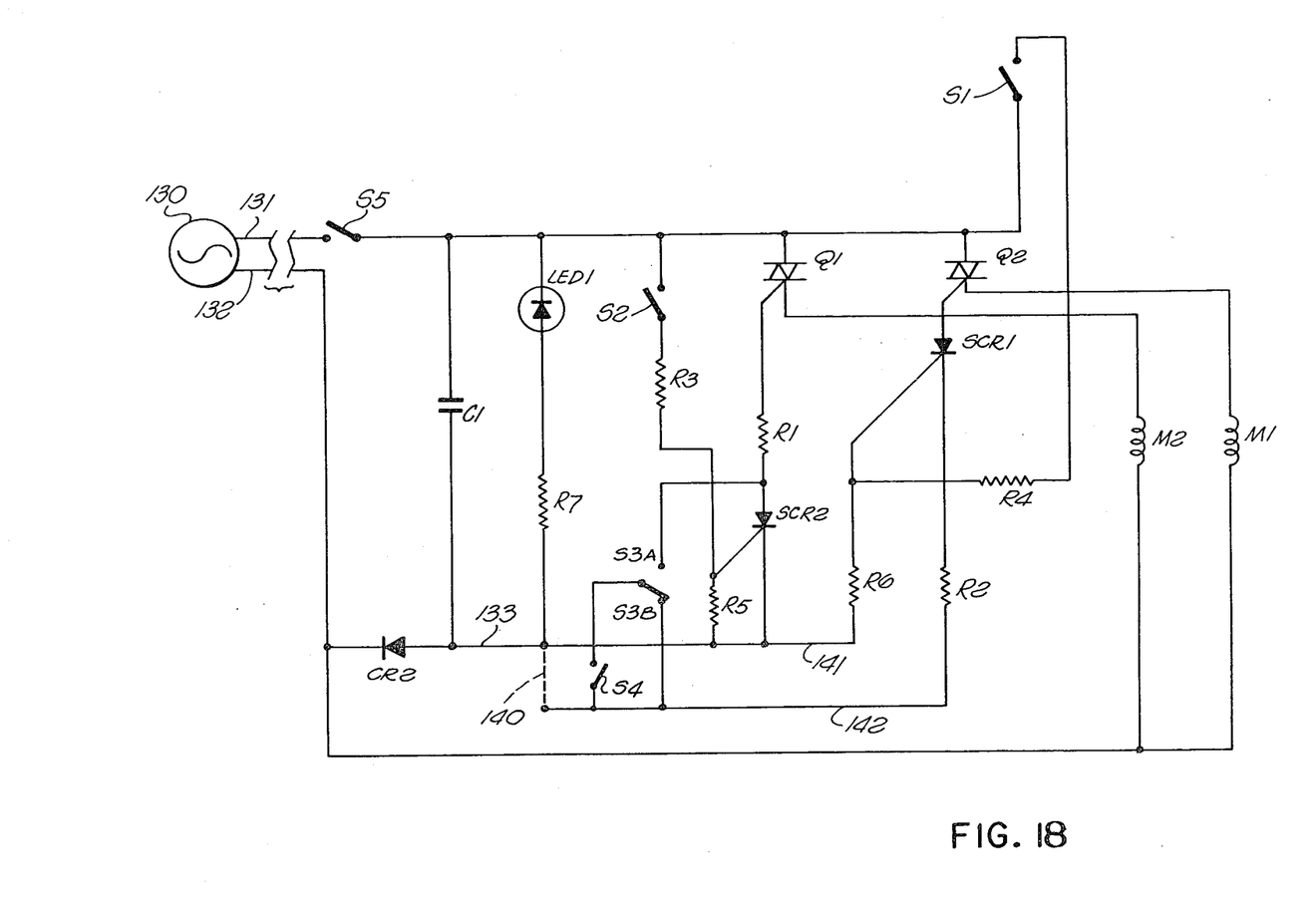
FIG. 18 is a preferred circuit diagram for the electrical components of the camera.

In addition to the components thus far described, the housing of the camera also contains various electrical components, as represented in the circuit diagram of FIG. 18. Power is supplied to this circuit from an external alternating current source represented at 130 through two leads 131 and 132. The previously mentioned switch S5 which responds to presence or absence of film in the camera is connected into line 131. A switch S1 typically positioned remotely from the camera per se acts when closed to commence operation of the camera, and may be a manually actuated switch positioned at a strategically accessible location, or an automatically operated switch actuable by a photo-electric light beam arrangement, a counter mechanism, a door operated unit, or the like. An additional switch S4 serves when closed to condition the circuitry to take pictures sequentially and continuously until the film is used, rather than merely taking a single frame as occurs when switch S4 is open. The same result can be attained more permanently by connection of a jumper line 140 between the lines 141 and 142 in FIG. 18.

The typically 26 volt AC power supply is delivered through a first AC silicon switch (Triac) Q2 to the shutter motor M1, and through a second alternating current silicon switch Q1 to the film advancing motor M2, in the circuit illustrated. A silicon controlled rectifier SCR1 controls switch Q2, while a second silicon controlled rectifier SCR2 controls switch Q1. A diode CR2 rectifies the alternating current and together with a capacitor C1 provides a direct current between line 131 and a line 133. A light emitting diode LED1 and resistor R7 are connected across the DC power lines to indicate visually when the camera is energized. Besides these various components, a number of additional resistors R1, R2, R3, R4, R5 and R6 are connected into the circuitry as shown, to limit the current flow and appropriately bias the electronic switches.

In placing the camera in use, the device is mounted at an appropriate location for photographing a particular critical area, and the line leading to the trigger switch S1 is extended to locate that switch at a remote location at which an operator or automatic equipment of some type can actuate the camera by closure of switch S1 when desired. Alternating current of the proper potential is applied to lines 131 and 132, but does not reach the circuitry of the camera unless film is present in compartment 40. To load film in the camera, the key actuated lock 25 is turned to release inner housing 12 for forward movement relative to the outer housing and to the broken line position of FIG. 1. In that condition, the two top openings 23 and 24 in the housing are in registry, and permit a film magazine 25 to be inserted downwardly through those openings and into compartment 40 to the fully inserted position of FIG. 1. As the cartridge moves downwardly, it momentarily engages wheel 76 and deflects it laterally to the FIG. 12 position, and then in the fully inserted setting of the cartridge so positions the portion of the film which is exposed at the location of front aperture 69 of the cartridge that the toothed edge 75 of that part of the film contacts and meshes with gear 76 (FIG. 10). In this position, switch S5 is closed and conducts alternating current power to the circuitry of the camera, simultaneously energizing LED 1 to indicate that the camera is ready for operation. If it is desired to take only a single frame on each operation of the camera, the switch S4 is opened.

If switch S1 is then closed, the camera operates through a cycle for taking a picture and then advances the film in preparation for the next successive frame. Referring to the circuit diagram of FIG. 18, it will be noted that closure of switch S1 applies a direct current potential to the gate 134 of SCR1, and that signal functions to turn on SCR1 to apply a signal through gate 135 to Q2, thereby turning on that switch and applying power to M1 commencing its rotation. This motor drives shutter 37 rotatably about its axis from a starting position in which the slit 44 is at one side of the aperture 69 of the film magazine, with the slit then moving across that aperture 69 to expose the film frame at that location for recording of the image then produced by the lens assembly. The signal supplied to SCR1 through gate 134, though produced by only a momentary closure of switch S1, effectively latches SCR1 in its conductive state until later opening of switch S3B.

After the shutter slit 44 has traversed the film aperture, the shutter carried cam 49 reaches a point at which the reduced diameter notch in its periphery contacts the follower arm of switch S2, briefly closing and then reopening that switch, to apply a momentary signal to gate 136 of SCR2 latching it in conductive state. SCR2 energizes the gate 137 of switch Q1, to turn on that switch and energize film advancing motor M2. This motor is thus placed in operation to commence advancement of the film immediately after the shutter slit has completed traversing of the film frame. As motor M2 turns, it drives element 72 rotatively, and through that element acts to turn the spool and the lower portion of the film magazine, advancing the film downwardly to a position for exposure of the next successive frame. As the film advances, it turns gear wheel 76 in exact correspondence with the linear movement of the film. Before commencement of this film motion, the cam follower 113 of switch S3 is received within one of the three notches 115 of cam 112. Immediately upon commencement of rotation of wheel 76 and cam 112, the follower 113 is lifted out of the notch 115, to thereby close the normally open switch S3A of the circuit and open the normally closed switch S3B. Closure of switch S3A applies a signal to SCR2 to reset it to an open, non-conductive condition, while still maintaining Q1 closed through switch S3A and thereby continuing operation of motor M2. The film motor M2 continues to operate until the film has been advanced through one full frame, at which time follower 113 of switch 53 falls into the next successive notch 115 of cam 112 to open switch S3A and thereby turn off the film advance motor. The film is then in a position to take the next picture.

When switch S4 is in its open condition, to set the device in a single frame condition, the opening of switch S3B at the commencement of operation of film motor M2 acts to break the circuit to SCR1 and turn SCR1 and the shutter motor M1 off. The rate of rotation of the shutter motor is slow enough that the shutter 37 is stopped in this manner before its light passing slit 44 can reach the film aperture 39 a second time. For example, the shutter may stop in a position in which its slit 44 is in the lower 180° of its travel. The shutter will stop in this position before completion of the previously discussed advancement of the film to the location for exposing the next frame. After the film reaches that location, the advancement is automatically stopped, as discussed, and the camera is then in condition for a next successive cycle of operation upon closure of control switch S1.

The switch S2 and it cam must be designed to give switch S2 a very short "on" time, specifically short enough to assure reopening of switch S2 before the shutter motor M1 stops. Stated differently, switch S2 is turned off before motor M2 opens switch S3B and stops motor M1. The cam which actuates switch S3 must give S3B sufficient "on" time to attain this desired timing.

Figure 13:
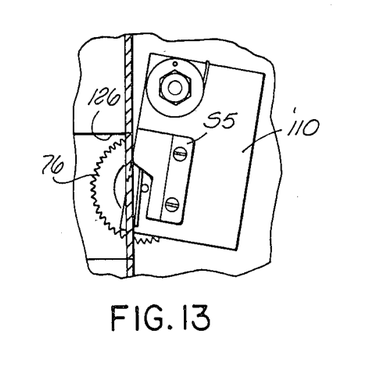
FIG. 13 is similar to FIG. 11 but shows the position of the film motion sensing assembly when no film is present in the camera.
Figure 14:
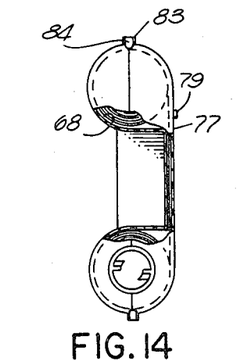
FIG. 14 is a side view of the film magazine.
Figure 15:
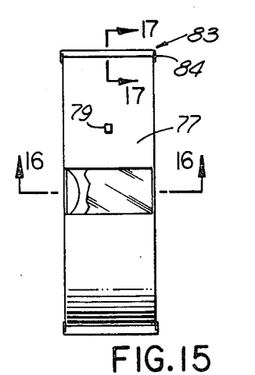
FIG. 15 is a front view of the magazine taken on line 15—15 of FIG. 14.
Figures 16, 17:
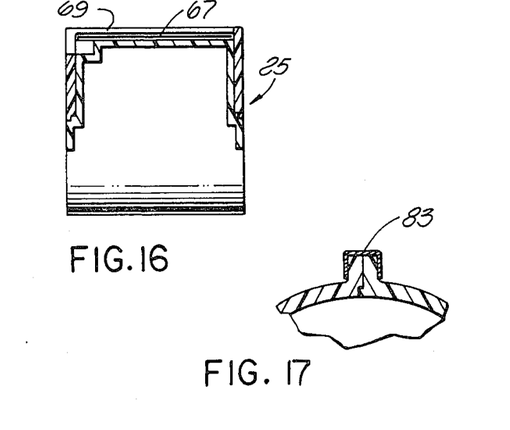
FIGS. 16 and 17 are enlarged sections taken on lines 16—16 and 17—17 respectively of FIG. 15.

When switch S4 is closed, or conductive jumper 140 is connected between lines 141 and 142, to place the camera in its continuous run mode, this switch or jumper maintains energization of SCR1 even when switch S3B is opened, and consequently once SCR1 has been latched closed by actuation of switch S1, SCR1 and Q2 remain on and motor M1 continues to operate without interruption until all of the film has been used, at which time movement of the last portion of the film past the location of wheel 76 allows that wheel to move inwardly to its FIG. 13 position opening switch S5 and de-energizing the entire camera.

In the continuous operation mode, the shutter motor actuated cam 49 functions in the same manner as in the single frame mode to instantaneously close switch S2 each time that a frame has been exposed, to thereby latch SCR1 closed and energize the film motor to advance the film. The relative rates of rotation of the two motors and their driven parts are such that the film motor will complete advancement of the film to its position for exposing the next successive frame before the slit 44 of the continuously operating shutter 37 can reach the film apertures 39 and 69 a second time.

After the film in a particular magazine has been completely exposed, the inner housing part is again moved forward to permit upward withdrawal of the magazine through the top openings in the housing structure, with the bevelled surfaces on plates 70 and 72 again deflecting part 70 axially to enable such removal of the magazine.

In order to assure a complete disclosure of the particular presently preferred circuitry as illustrated in FIG. 18, we will set forth below the electrical values and component types which may be employed in this circuit.

| Component | Value or Type |
| --- | --- |
| SCR1 | Type 2N2322 |
| SCR2 | Type 2N2322 |
| Q1 | RCA Triac T2800 |
| Q2 | RCA Triac T2800 |
| C1 | 250 microfarad, 50 V. |
| R1 | 1200 ohms |
| R2 | 1200 ohms |
| R3 | 10 K |
| R4 | 10 K |
| R5 | 2 K |
| R6 | 2 K |
| R7 | 2 K |
| CR1 | Type IN4003 |
| CR2 | Type IN4003 |
| Power Source | 26 V. AC |
| Motors | 26 V. AC |

While a certain specific embodiment of the present invention has been disclosed as typical, the invention is of course not limited to this particular form, but rather is applicable broadly to all such variations as fall within the scope of the appended claims.

I claim:
1. A camera, comprising in combination:
   an outer housing having at least one open end and containing a wall portion;
   an inner housing containing photographic means, slidably mounted within the outer housing for movement relative thereto between an active position and a loading position, said inner housing including a wall portion;
   a compartment in said inner housing for receiving a magazine containing film and having an open end;
   a first passageway contained in said wall portion of the inner housing in communication with the open end of said compartment, which is of a size to pass a film magazine therethrough; and a second passageway in the wall portion of the outer housing of a size complimentary to that of said first passageway, said passageways being arranged in the walls of the respective housings whereby they are in alignment when the inner housing is in the loading position and are out of alignment when the inner housing is in the active position.

2. A camera as described in claim 1, which includes means for releasably locking the inner housing within the outer housing when the inner housing is in the active position.

3. A camera as described in claim 1, in which the inner housing extends beyond said open end of the outer housing when the inner housing is in the loading position, and in which the photographic means include an adjustable lens with adjusting means located within the inner housing, said adjusting means being accessible for manual adjustment of the lens when said inner housing is in the loading position.

4. A camera, comprising in combination:

an outer tubular housing with at least one open end and including an upper wall portion;

an inner housing containing photographic means and including an upper wall portion, slidably mounted within the outer housing for movement relative thereto between an active position in which the inner housing is positioned essentially within the outer housing, and a loading position in which the inner housing extends beyond said open end of the outer housing;

a compartment in said inner housing for receiving a magazine containing film and including an open end adjacent said upper wall portion of the inner housing;

a first passageway in the upper wall portion of the inner housing in communication with the open end of the film magazine, said passageway being of a size and shape for a film magazine to pass therethrough; and a second passageway in the upper wall portion of the outer housing of a size and shape complimentary to that of the first passageway, said second passageway being located so that it is in alignment with the first passageway when the inner housing is in the loading position and spaced therefrom when the inner housing is in the active position.

5. A camera as described in claim 5, in which:

the photographic means include an adjustable lens having a front end and with adjusting means therefor located within the inner housing;

the inner housing includes a front wall which is essentially coextensive with the open end of the outer housing and which contains an aperture for receiving said front end of the lens; and said adjusting means is exposed for manual adjustment thereof when the inner housing is in the loading position.

6. A camera as described in claim 6, which includes means for releasably locking the inner housing within the outer housing when the inner housing is in the active position, said locking means being mounted on the front wall of the inner housing.

* * * * *